US012732968B2

(12) United States Patent
Chang et al.

(10) Patent No.: US 12,732,968 B2
(45) Date of Patent: Sep. 8, 2026

(54) DISCOVERY RESOURCE SELECTION BASED ON DISCOVERY TRANSMISSION TYPE

(71) Applicant: Kyocera Corporation, Kyoto (JP)

(72) Inventors: Henry Chang, San Diego, CA (US); Masato Fujishiro, Yokohama (JP)

(73) Assignee: Kyocera Corporation, Kyoto (JP)

( * ) Notice: Subject to any disclaimer, the term of this patent is extended or adjusted under 35 U.S.C. 154(b) by 295 days.

(21) Appl. No.: 18/287,423

(22) PCT Filed: May 6, 2022

(86) PCT No.: PCT/US2022/028105
§ 371 (c)(1),
(2) Date: Oct. 18, 2023

(87) PCT Pub. No.: WO2022/240684
PCT Pub. Date: Nov. 17, 2022

(65) Prior Publication Data

US 2024/0224233 A1 Jul. 4, 2024

Related U.S. Application Data

(60) Provisional application No. 63/186,556, filed on May 10, 2021.

(51) Int. Cl.
*H04W 4/00* (2018.01)
*H04B 17/318* (2015.01)
(Continued)

(52) U.S. Cl.
CPC .......... *H04W 72/02* (2013.01); *H04B 17/328* (2023.05); *H04W 8/005* (2013.01);
(Continued)

(58) Field of Classification Search
USPC .................................................. 370/329, 330
See application file for complete search history.

(56) References Cited

U.S. PATENT DOCUMENTS 12,022,562 B2 * 6/2024 Yang .................... H04L 1/0003
2016/0278003 A1 9/2016 Kim et al.
(Continued)

FOREIGN PATENT DOCUMENTS

WO 2021-034166 A1 2/2021
WO 2022-240681 A1 11/2022
(Continued)

OTHER PUBLICATIONS

ZTE Corporation, Sanechips; "Discussion on remaining issues for sidelink discovery", R2-2100308; 3GPP TSG RAN WG2 Meeting #113-e; Jan. 15, 2021.
(Continued)

*Primary Examiner* — Chuong T Ho
(74) *Attorney, Agent, or Firm* — Studebaker Brackett PLLC

(57) ABSTRACT

The devices, systems, and methods discussed herein include a first user equipment (UE) device receiving, from a base station, discovery resource pool configuration information indicating that a first discovery resource pool is associated with a first type of discovery transmission and that a second discovery resource pool is associated with a second type of discovery transmission. The first UE device selects the first discovery resource pool for communication via the first type of discovery transmission and selects the second discovery resource pool for communication via the second type of discovery transmission.

15 Claims, 4 Drawing Sheets

(51) Int. Cl.

| | |
|---|---|
| ***H04W 8/00*** | (2009.01) |
| ***H04W 48/12*** | (2009.01) |
| ***H04W 48/16*** | (2009.01) |
| ***H04W 72/02*** | (2009.01) |
| ***H04W 72/40*** | (2023.01) |
| *H04W 88/04* | (2009.01) |
| *H04W 92/18* | (2009.01) |

(52) U.S. Cl.
CPC .......... *H04W 48/12* (2013.01); *H04W 48/16* (2013.01); *H04W 72/40* (2023.01); *H04W 88/04* (2013.01); *H04W 92/18* (2013.01)

(56) References Cited

U.S. PATENT DOCUMENTS

| | | | | |
|---|---|---|---|---|
| 2016/0302251 | A1* | 10/2016 | Chatterjee | H04B 7/0456 |
| 2018/0020339 | A1 | 1/2018 | Agiwal et al. | |
| 2018/0091254 | A1 | 3/2018 | Ryu et al. | |
| 2019/0327724 | A1* | 10/2019 | Zhao | H04L 5/0005 |
| 2019/0335383 | A1 | 10/2019 | Agiwal et al. | |
| 2020/0389900 | A1 | 12/2020 | Lee et al. | |
| 2021/0331701 | A1 | 10/2021 | Hur | |
| 2023/0180097 | A1* | 6/2023 | Zhang | H04B 7/1555 370/315 |
| 2023/0284206 | A1* | 9/2023 | Hoang | H04W 72/1263 370/329 |
| 2023/0309009 | A1* | 9/2023 | Back | H04W 48/16 |
| 2024/0040547 | A1* | 2/2024 | Zhang | H04W 8/005 |
| 2024/0205883 | A1* | 6/2024 | Chang | H04W 48/16 |
| 2024/0306145 | A1* | 9/2024 | Hoang | H04W 72/02 |

FOREIGN PATENT DOCUMENTS

| | | | |
|---|---|---|---|
| WO | 2022-240683 | A1 | 11/2022 |
| WO | 2022-240684 | A1 | 11/2022 |
| WO | 2022-240686 | A1 | 11/2022 |

OTHER PUBLICATIONS

Interdigital Inc.; “Discovery procedure for Sidelink relay”, R2-2100522; 3GPP TSG RAN WG2 Meeting #113-e; Jan. 15, 2021.
Interdigital Inc.; “Discovery procedure for SL relay”, R2-2009204; 3GPP TSG RAN WG2 Meeting #112-e; Oct. 22, 2020.
CATT; “Discovery for Sidelink U2N Relay”, R2-2102698; 3GPP TSG RAN WG2 Meeting #113bis-e; Apr. 2, 2021.
Intel Corporation; “Sl Relay Discovery aspects”, R2-2103071; 3GPP TSG RAN WG2 #113bis-e; Apr. 2, 2021.
Huawei, Hisilicon; “Support of discovery for sidelink relay”, R2-2103493; 3GPP TSG RAN WG2 #113bis-e; Apr. 2, 2021.
Qualcomm Incorporated; “Discussion on relay discovery”, R2-2102687; 3GPP TSG RAN WG2 Meeting #113bis-e; Apr. 2, 2021.
Ericsson; “Left issues for SL discovery”, R2-2103000; 3GPP TSG RAN WG2 Meeting #113bis-e; Apr. 2, 2021.
OPPO; “Discussion on NR sidelink relay discovery”, R2-2103006; 3GPP TSG RAN WG2 Meeting #113bis-e; Apr. 1, 2021.
Interdigital Inc.; “Discovery procedure for Sidelink relay”, R2-2102806; 3GPP TSG RAN WG2 Meeting #113bis-e; Apr. 2, 2021.

* cited by examiner

DISCOVERY RESOURCE SELECTION BASED ON DISCOVERY TRANSMISSION TYPE

CLAIM OF PRIORITY

The present application claims priority to Provisional Application No. 63/186,556, entitled "COEXISTENCE HANDLING OF MULTIPLE DISCOVERY RESOURCE TYPES," filed May 10, 2021, which is assigned to the assignee hereof and hereby expressly incorporated by reference in its entirety.

FIELD

This invention generally relates to wireless communications and more particularly to selecting a discovery resource to use for discovery transmissions between wireless communication devices.

BACKGROUND

Sidelink relaying functionality allows a remote user equipment (UE) device that is out-of-coverage (OoC) to connect with the gNB or base station via a relay UE device.

SUMMARY

The devices, systems, and methods discussed herein include a first user equipment (UE) device receiving, from a base station, discovery resource pool configuration information indicating that a first discovery resource pool is associated with a first type of discovery transmission and that a second discovery resource pool is associated with a second type of discovery transmission. The first UE device selects the first discovery resource pool for communication via the first type of discovery transmission and selects the second discovery resource pool for communication via the second type of discovery transmission.

DETAILED DESCRIPTION

Figure 1:
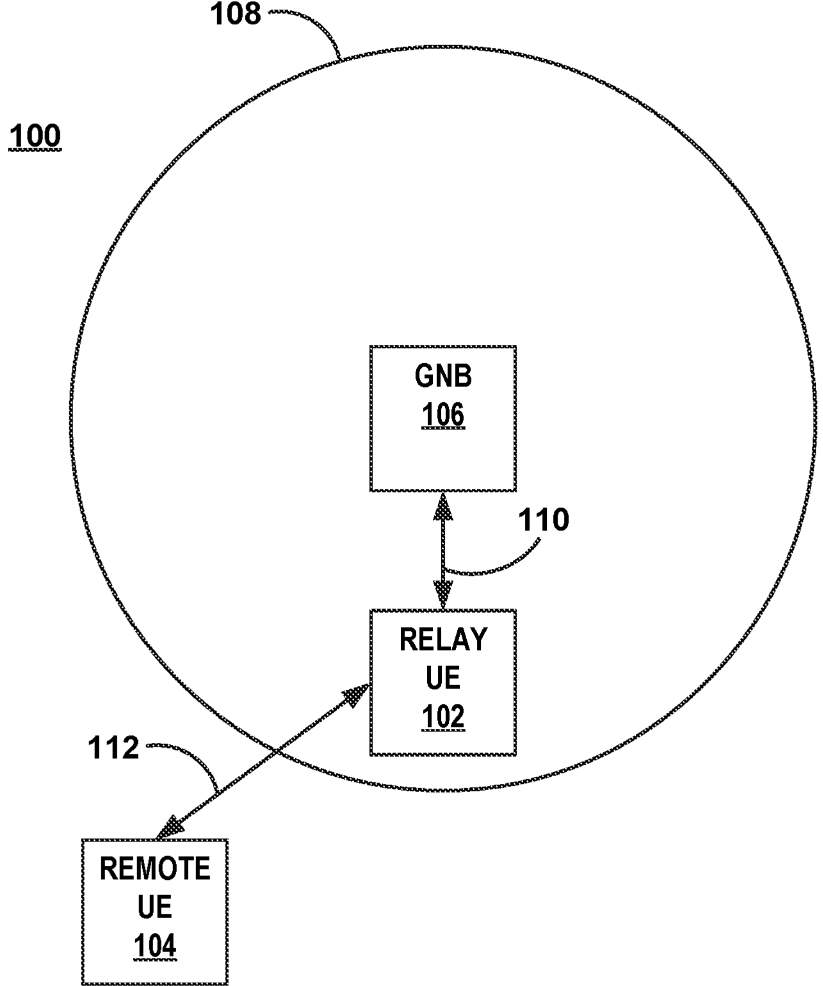
FIG. 1 is a block diagram of an example of a system in which a relay user equipment (UE) device acts as a relay between a base station and a remote UE device.

There are two types of sidelink relaying: UE-to-Network (U2N) relaying and UE-to-UE (U2U) relaying. For U2N relaying, both the relay UE and remote UE may be in coverage of a cell provided by a base station (e.g., gNB), but in other cases, the relay UE is in coverage while the remote UE is out-of-coverage (OoC), as shown in the example of FIG. 1. Therefore, for U2N relaying, the relay UE needs to be in coverage of a cell and connected to the gNB that provides wireless services within the cell. With U2U relaying, there is no such restriction. Thus, for U2U relaying, the relay UE may be in coverage or OoC of the cell.

In the context of U2N relaying, the UEs may use either a Model A or a Model B discovery procedure to discover each other as part of the relay selection and reselection procedure. With the Model A discovery procedure, either the remote UE or the relay UE may announce their presence with a transmission indicating "I am here," and no response is expected. The discovery transmissions that are sent during the Model A discovery procedure are referred to herein as "unsolicited discovery transmissions."

With the Model B discovery, one of the UEs transmits a request asking "Are you there?". The receiving UE may respond to the request by announcing its presence. The discovery transmissions that are sent during the Model B discovery procedure are referred to herein as "solicited discovery transmissions."

One of the important factors in the discovery procedure is the determination of which discovery resource will be used for the discovery transmissions. In general, if the UE device is in coverage of a cell, the discovery resource should be controlled by the gNB that provides wireless services within the cell. If the UE device is OoC, the UE device may use a pre-configured discovery resource.

One of the ways for the gNB to provide a discovery resource is the use of a discovery resource pool, which is a pool of communication resources that have been allocated for UEs to use for discovery transmissions. Both the remote UE and the relay UE may use communication resources from a designated discovery resource pool. The gNB usually provides the discovery resource pool information to the UEs via System Information Block (SIB) (e.g., SIB12) messaging. In some examples, the UEs may utilize sensing to prevent the UEs from all using the same resource within a discovery resource pool.

There are generally two types of discovery resource pools that may be provided to the UEs. For example, the first type of discovery resource pool may be a shared discovery and data resource pool, in which the communication resources may be used for both discovery transmissions and data transmissions. The second type of discovery resource pool is a separate discovery resource pool (e.g., which includes resources to be used only for discovery transmissions) that is separate from a data resource pool (e.g., which includes resources to be used only for data transmissions). In some examples, the network may decide to use only one type of resource pool for discovery. However, in other examples, the network may determine that it is beneficial to simultaneously deploy shared discovery resource pools and separate discovery resource pools since each type of discovery resource pool has its own potential advantages.

For example, with a shared discovery and data resource pool, the network may only need to manage one resource pool that is applicable to both discovery and data transmissions. More specifically, a network that utilizes a single resource pool may advantageously (1) reduce possible resource waste caused by having separate discovery and data resource pools, and (2) reduce the complexity for handling a shared discovery and data resource pool, as well as separate discovery and data resource pools.

There may be different advantages to the network utilizing separate discovery and data resource pools, such as: reduced collisions between data and discovery transmissions; reduced power consumption by having separate power saving schemes since data and discovery have different functionalities (e.g., transmission periodicities); fixed discovery transmission power may be used without the complex power control required when a shared discovery resource pool is used; and no need to introduce prioritization between discovery and data transmissions and to identify whether a transmission is for discovery or data.

However, if both types of discovery resource pools are deployed in a network, it is necessary for the UEs to understand how to choose between the two types of resource pools. Although there are different solutions to guide the UEs in choosing which discovery resource pool to use, the examples described herein are generally based on the UE selecting a discovery resource pool based on a type of discovery transmission that will be utilized by the UE for discovery.

The devices, systems, and methods discussed herein include a first user equipment (UE) device receiving, from a base station, discovery resource pool configuration information indicating that a first discovery resource pool is associated with a first type of discovery transmission and that a second discovery resource pool is associated with a second type of discovery transmission. The first UE device selects the first discovery resource pool for communication via the first type of discovery transmission and selects the second discovery resource pool for communication via the second type of discovery transmission. In some examples, a first user equipment (UE) device that is out-of-coverage may use discovery resource pools associated with the first discovery resource pool and the second resource pool that are pre-configured.

Although the different examples described herein may be discussed separately, any of the features of any of the examples may be added to, omitted from, or combined with any other example. Similarly, any of the features of any of the examples may be performed in parallel or performed in a different manner/order than that described or shown herein.

Figure 2A:
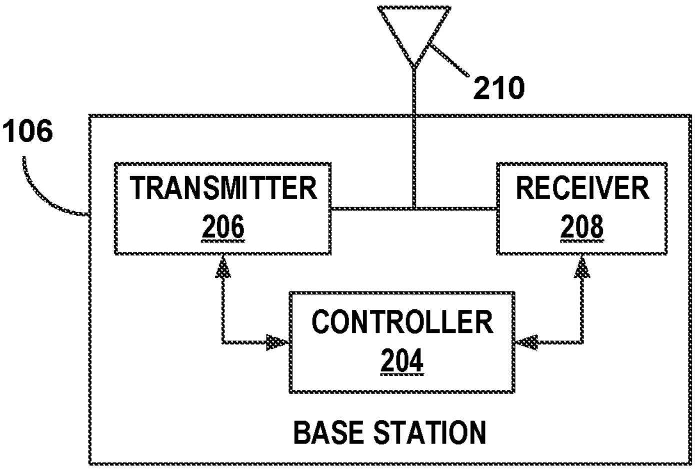
FIG. 2A is a block diagram of an example of the base station shown in FIG. 1.
Figure 2B:
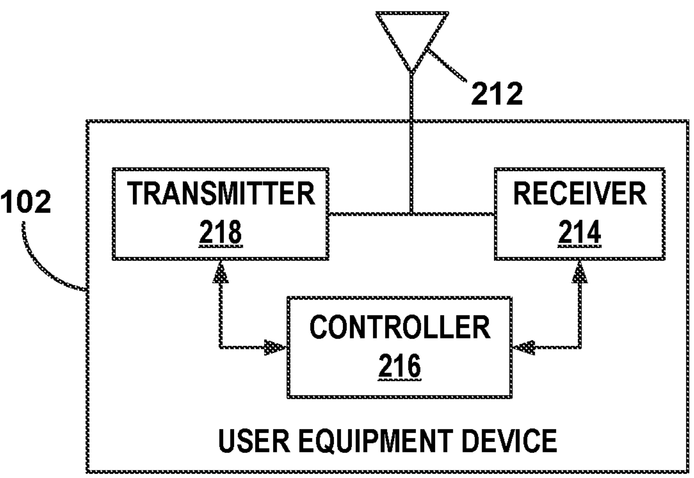
FIG. 2B is a block diagram of an example of the user equipment devices shown in FIG. 1.

FIG. 1 is a block diagram of an example of a system 100 in which a relay user equipment (UE) device acts as a relay between a base station and a remote UE device. In the interest of brevity, FIG. 1 only depicts one relay UE device 102 and one remote UE device 104. However, any number of relay UE devices and remote UE devices may be utilized, in other examples. As shown in FIG. 2B, user equipment device (UE) 102 comprises controller 216, transmitter 218, receiver 214, and antenna 212, as well as other electronics, hardware, and software code. Relay UE device 102 may also be referred to herein as a relay UE or as a relay wireless communication device (WCD). UE 102 is wirelessly connected to a radio access network (not shown) via base station 106, which provides various wireless services to UE 102. For the example shown in FIG. 1, UE 102 operates in accordance with at least one revision of the 3rd Generation Partnership Project 5G New Radio (3GPP 5G NR) communication specification. In other examples, UE 102 may operate in accordance with other communication specifications. For the example shown in FIG. 1, both of the UEs have the same components, circuitry, and configuration as UE 102 from FIG. 2B. However, any of the UEs in FIG. 1 may have components, circuitry, and configuration that differ from UE 102, in other examples.

UE 102 is any fixed, mobile, or portable equipment that performs the functions described herein. The various functions and operations of the blocks described with reference to UE 102 may be implemented in any number of devices, circuits, or elements. Two or more of the functional blocks may be integrated in a single device, and the functions described as performed in any single device may be implemented over several devices.

Controller 216 includes any combination of hardware, software, and/or firmware for executing the functions described herein as well as facilitating the overall functionality of a user equipment device. An example of a suitable controller 216 includes software code running on a microprocessor or processor arrangement connected to memory. Transmitter 218 includes electronics configured to transmit wireless signals. In some situations, transmitter 218 may include multiple transmitters. Receiver 214 includes electronics configured to receive wireless signals. In some situations, receiver 214 may include multiple receivers. Receiver 214 and transmitter 218 receive and transmit signals, respectively, through antenna 212. Antenna 212 may include separate transmit and receive antennas. In some circumstances, antenna 212 may include multiple transmit and receive antennas.

Transmitter 218 and receiver 214 in the example of FIG. 2B perform radio frequency (RF) processing including modulation and demodulation. Receiver 214, therefore, may include components such as low noise amplifiers (LNAs) and filters. Transmitter 218 may include filters and amplifiers. Other components may include isolators, matching circuits, and other RF components. These components in combination or cooperation with other components perform the user equipment device functions. The required components may depend on the particular functionality required by the user equipment device.

Transmitter 218 includes a modulator (not shown), and receiver 214 includes a demodulator (not shown). The modulator can apply any one of a plurality of modulation orders to modulate the signals to be transmitted by transmitter 218. The demodulator demodulates received signals, in accordance with one of a plurality of modulation orders.

In the interest of clarity and brevity, only one base station is shown in FIG. 1. However, in other examples, any suitable number of base stations may be utilized. In the example of FIG. 1, base station 106 provides wireless services to UEs within coverage area 108. Although not explicitly shown, coverage area 108 may be comprised of multiple cells. For the example shown in FIG. 1, base station 106, sometimes referred to as a gNodeB or gNB, can receive uplink messages from UE devices and can transmit downlink messages to the UE devices.

Base station 106 is connected to the network through a backhaul (not shown) in accordance with known techniques. As shown in FIG. 2A, base station 106 comprises controller 204, transmitter 206, receiver 208, and antenna 210 as well as other electronics, hardware, and code. Base station 106 is any fixed, mobile, or portable equipment that performs the functions described herein. The various functions and operations of the blocks described with reference to base station 106 may be implemented in any number of devices, circuits, or elements. Two or more of the functional blocks may be integrated in a single device, and the functions described as performed in any single device may be implemented over several devices.

For the example shown in FIG. 2A, base station 106 may be a fixed device or apparatus that is installed at a particular location at the time of system deployment. Examples of such equipment include fixed base stations or fixed transceiver stations. In some situations, base station 106 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, base station 106 may be a portable device that is not fixed to any particular location. Accordingly, base station 106 may be a portable user device such as a UE device in some circumstances.

Controller 204 includes any combination of hardware, software, and/or firmware for executing the functions described herein as well as facilitating the overall functionality of base station 106. An example of a suitable controller 204 includes code running on a microprocessor or processor arrangement connected to memory. Transmitter 206 includes electronics configured to transmit wireless signals. In some situations, transmitter 206 may include multiple transmitters. Receiver 208 includes electronics configured to receive wireless signals. In some situations, receiver 208 may include multiple receivers. Receiver 208 and transmitter 206 receive and transmit signals, respectively, through antenna 210. Antenna 210 may include separate transmit and receive antennas. In some circumstances, antenna 210 may include multiple transmit and receive antennas.

Transmitter 206 and receiver 208 in the example of FIG. 2A perform radio frequency (RF) processing including modulation and demodulation. Receiver 208, therefore, may include components such as low noise amplifiers (LNAs) and filters. Transmitter 206 may include filters and amplifiers. Other components may include isolators, matching circuits, and other RF components. These components in combination or cooperation with other components perform the base station functions. The required components may depend on the particular functionality required by the base station.

Transmitter 206 includes a modulator (not shown), and receiver 208 includes a demodulator (not shown). The modulator modulates the signals that will be transmitted and can apply any one of a plurality of modulation orders. The demodulator demodulates any uplink signals received at base station 106 in accordance with one of a plurality of modulation orders.

For the example shown in FIG. 1, base station 106 and relay UE device 102 are connected by Uu link 110, which is the radio interface between a base station and a UE device. Relay UE device 102 and remote UE device 104 are connected by PC5 link 112, which is an interface that allows UEs to communicate directly with each other over a direct channel. Other suitable types of communication links may be utilized in system 100, in other examples.

In operation, relay UE device 102 receives, via its antenna 212 and receiver 214, from base station 106, discovery resource pool configuration information indicating that a first discovery resource pool is associated with a first type of discovery transmission and that a second discovery resource pool is associated with a second type of discovery transmission. In some examples, the first discovery resource pool is a discovery resource pool that is separate from a data resource pool. In other examples, the first discovery resource pool is a shared discovery and data resource pool. Regardless of which discovery resource pool is prioritized, relay UE device 102 receives the configuration information via System Information Block (SIB) messaging, in some examples.

Relay UE device 102 utilizes its controller 216 to select the first discovery resource pool for communication via the first type of discovery transmission. Controller 216 selects the second discovery resource pool for communication via the second type of discovery transmission. Relay UE device 102 selects the discovery resource pool from a plurality of discovery resource pools. At least one of the plurality of discovery resource pools is a discovery resource pool that is separate from a data resource pool, and at least one of the plurality of discovery resource pools is a shared discovery and data resource pool.

In some examples, controller 216 of relay UE 102 is further configured to select a discovery resource pool that is separate from a data resource pool, based on whether remote UE 104 has knowledge of a discovery transmission power that will be used by relay UE 102, regardless of whether the discovery resource pool configuration information indicates that a shared discovery and data resource pool is associated with a particular type of discovery transmission. For example, in some cases a shared discovery and data resource pool may be selected to be used for discovery transmissions, but relay UE 102 knows that remote UE 104 is unaware of the discovery transmission power that will be used by relay UE 102 (e.g., when relay UE 102 has not informed relay UE 104 of the discovery transmission power or if the transmission power is not fixed). In these cases, relay UE 102 may be allowed to use the separate discovery resource pool, which should have a fixed transmission power, despite the fact that relay UE 102 may have previously selected a shared discovery and data resource pool. This allowance is important since, in some examples, remote UE 104 may determine which relay UE to select as a relay to the network, based on the signal strength of the discovery transmissions received from one or more relay UEs.

Once controller 216 of relay UE 102 has selected a discovery resource pool, relay UE 102 utilizes its transmitter 218 and antenna 212 to transmit discovery transmissions utilizing the selected discovery resource pool. In some examples, the discovery transmissions are unsolicited discovery transmissions. In other examples, the discovery transmissions are solicited discovery transmissions.

In some examples in which the discovery transmissions are solicited discovery transmissions transmitted via the first discovery resource pool, receiver 214 of relay UE 102 is configured to monitor the first discovery resource pool for a discovery response. Thus, in these examples, a UE responding to the solicited discovery transmission with a discovery response may be configured to use the same discovery resource pool over which the solicited discovery transmission (e.g., the discovery query) was transmitted. One potential advantage of such a configuration is that relay UE 102 would only need to monitor one discovery resource pool (e.g., to conserve power) if it knows that the discovery response will also be transmitted on the same discovery resource pool type over which the discovery query was transmitted.

The foregoing examples demonstrate how the discovery resource pools may be separated based on whether Model A (e.g., unsolicited) or Model B (e.g., solicited) discovery is used. For example, Model A could use the separate discovery resource pools, and Model B could use shared discovery resource pools, in some examples. Typically, Model A discovery uses a periodic announcement sent by the relay UEs since relay UEs are less sensitive to power consumption. Conversely, Model B discovery is used mainly by remote UEs, whereby the remote UE requests relay related information in a discovery solicitation message (e.g., discovery query). If the remote UE is not sending a discovery solicitation message in accordance with Model B, then the remote UE would only need to monitor the separate discovery pool for Model A discovery reception in case the remote UE wants to receive discovery transmissions from candidate relay UEs, as discussed more fully below in connection with FIG. 3. The discovery resource pools may be configured or associated, in some examples, with a category (e.g., Model A/B, relay UE, or remote UE) to which they apply.

Figure 3:
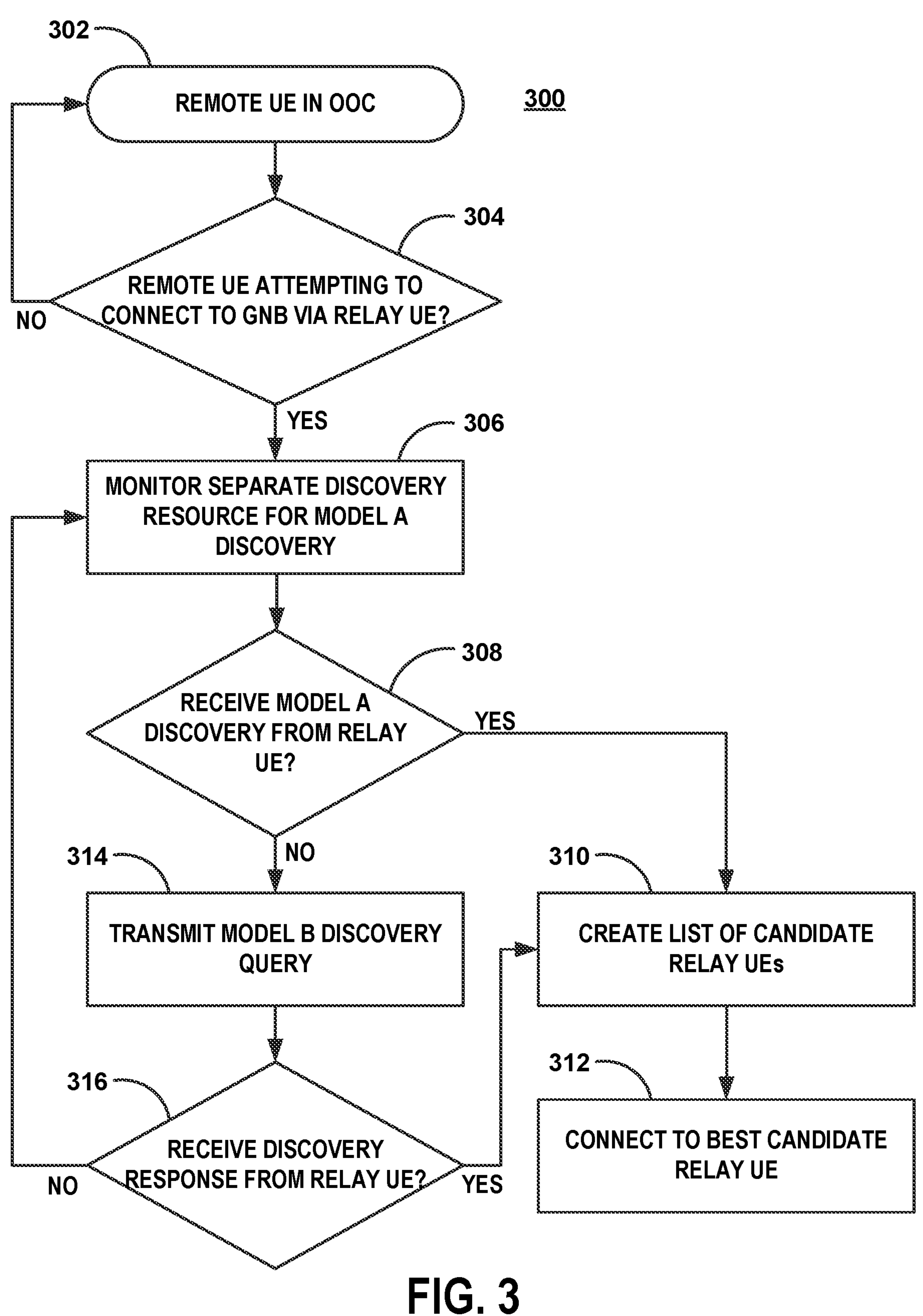
FIG. 3 is a process flow diagram of an example in which a remote UE device performs selection/reselection of a relay UE device based on discovery transmission type.

FIG. 3 is a process flow diagram of an example in which a remote UE device performs selection/reselection of a relay UE device based on discovery transmission type. Process 300 starts at 302 with remote UE 104 being out-of-coverage (OoC) of base station 106. At 304, remote UE 104 determines whether the upper layer of remote UE 104 has instructed remote UE 104 to connect to base station 106. If no instruction to connect to base station 106 has been received, process 300 continues at 302. If remote UE 104 has received an instruction to connect and is attempting to connect to base station 106 via a relay UE, process 300 proceeds to 306.

At 306, remote UE 104 monitors a separate discovery resource pool for Model A discovery. If a Model A discovery transmission is received, at 308, by remote UE 104 from one or more relay UEs, remote UE 104 will create a list, at 310, of one or more candidate relay UEs from which remote UE 104 received Model A discovery transmissions. In some examples, the list will be ordered based on the sidelink Discovery Reference Signal Received Power (SD RSRP) measured by remote UE 104 for each received Model A discovery transmission. At 312, remote UE 104 will select a best candidate relay UE from the list and connect to the selected relay UE.

If no Model A discovery transmissions are received at 308, remote UE 104 transmits, at 314, a Model B discovery transmission (e.g., discovery query) via a shared discovery resource pool. If remote UE 104 receives a discovery response, at 316, from one or more relay UEs, remote UE 104 will create a list of candidate relay UEs, at 310, and connect to the best candidate relay UE, at 312. If remote UE 104 does not receive a discovery response, at 316, process 300 continues with remote UE 104 monitoring the separate discovery resource for Model A discovery transmissions, at 306.

Figure 4:
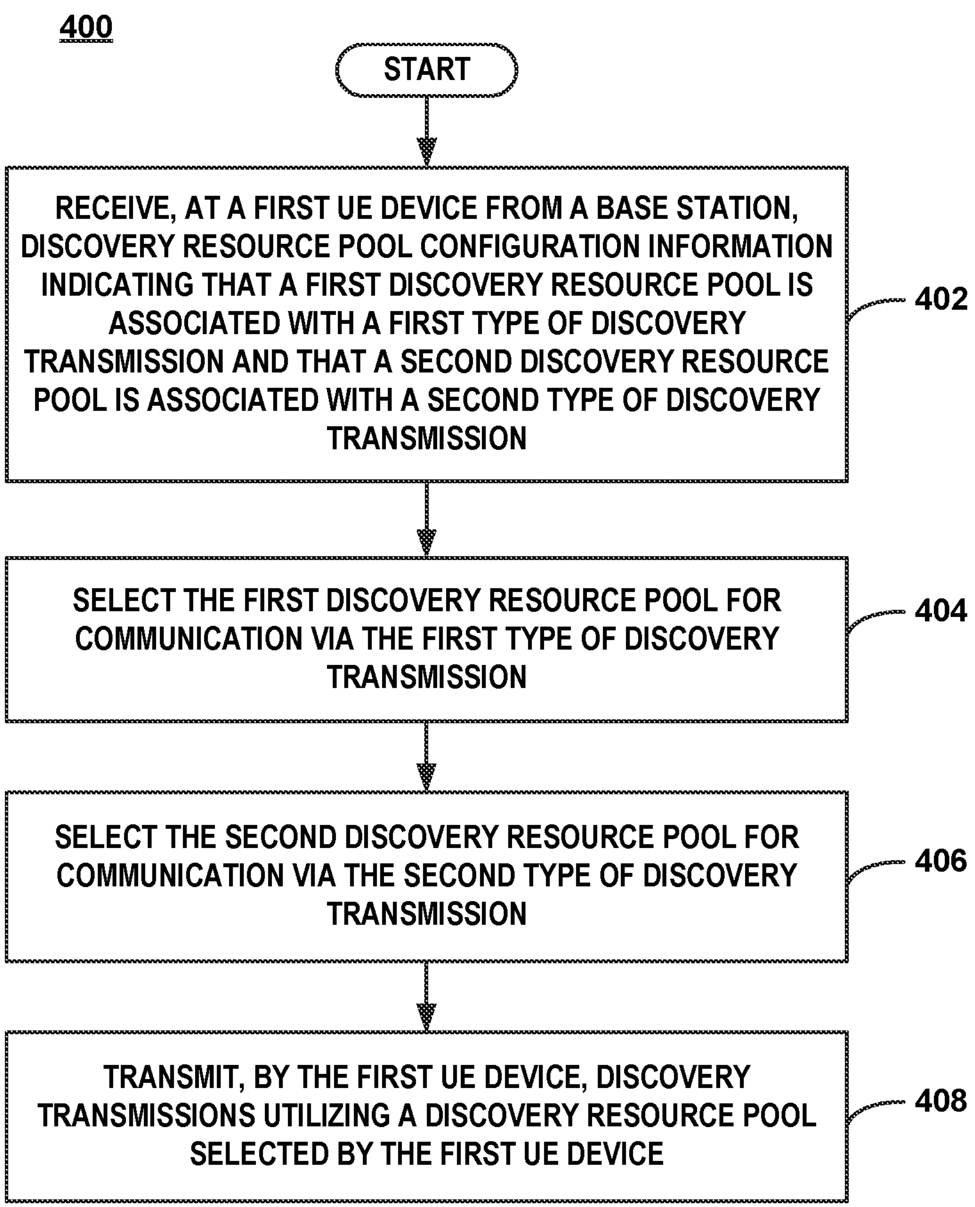
FIG. 4 is a flowchart of an example of a method in which a first UE device receives, from a base station, discovery resource pool configuration information indicating that a first discovery resource pool is associated with a first type of discovery transmission and that a second discovery resource pool is associated with a second type of discovery transmission. The first UE device selects the first discovery resource pool for communication via the first type of discovery transmission and selects the second discovery resource pool for communication via the second type of discovery transmission.

FIG. 4 is a flowchart of an example of a method in which a first UE device receives, from a base station, discovery resource pool configuration information indicating that a first discovery resource pool is associated with a first type of discovery transmission and that a second discovery resource pool is associated with a second type of discovery transmission. The first UE device selects the first discovery resource pool for communication via the first type of discovery transmission and selects the second discovery resource pool for communication via the second type of discovery transmission. The method 400 begins at step 402 with receiving, at a first UE device from a base station, discovery resource pool configuration information indicating that a first discovery resource pool is associated with a first type of discovery transmission and that a second discovery resource pool is associated with a second type of discovery transmission. At step 404, the first UE device selects the first discovery resource pool for communication via the first type of discovery transmission. At step 406, the first UE device selects the second discovery resource pool for communication via the second type of discovery transmission. At step 408, the first UE device transmits discovery transmissions utilizing a discovery resource pool selected by the first UE device. In other examples, one or more of the steps of method 400 may be omitted, combined, performed in parallel, or performed in a different order than that described herein or shown in FIG. 4. In still further examples, additional steps may be added to method 400 that are not explicitly described in connection with the example shown in FIG. 4.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A first user equipment (UE) device comprising:

a receiver configured to receive, from a base station, a System Information Block (SIB) message including resource pool configuration information indicating a separate discovery resource pool and a shared discovery resource pool, the separate discovery resource pool being dedicated for sidelink discovery transmission, the shared discovery resource pool being shared for both sidelink discovery transmission and sidelink communication transmission; and a controller configured to monitor the separate discovery resource pool, select the separate discovery resource pool for the sidelink discovery transmission when a result of monitoring the separate discovery resource pool is available, and select the shared discovery resource pool for the sidelink discovery transmission when a result of monitoring the separate discovery resource pool is not available.

2. The first UE device according to claim 1, wherein the separate discovery resource pool is associated with a first type of discovery transmission and that the shared discovery resource pool is associated with a second type of discovery transmission; and the controller is further configured to:

select the separate discovery resource pool for communication via the first type of discovery transmission, and select the shared discovery resource pool for communication via the second type of discovery transmission.

3. The first UE device of claim 2, wherein the first type of discovery transmission is an unsolicited discovery transmission.

4. The first UE device of claim 2, wherein the first type of discovery transmission is a solicited discovery transmission.

5. The first UE device of claim 2, wherein the controller is further configured to select the separate discovery resource pool based on whether a second UE device has knowledge of a discovery transmission power that will be used by the first UE device.

6. The first UE device of claim 5, wherein the first UE device is in-coverage of the base station and the second UE device is out-of-coverage of the base station.

7. The first UE device of claim 2, further comprising:

a transmitter configured to transmit discovery transmissions utilizing a discovery resource pool selected by the controller.

8. The first UE device according to claim 1, wherein the separate discovery resource pool is associated with a first type of discovery transmission and that the shared discovery resource pool is associated with a second type of discovery transmission; and the receiver is further configured to monitor the separate discovery resource pool when the first UE device is attempting to connect to the base station via a second UE device;

the controller is further configured to:

upon receipt of at least one discovery transmission that was transmitted via the separate discovery resource pool in accordance with the first type of discovery transmission, create a list of one or more candidate relay UE devices, and select a relay UE device from the list; and a transmitter configured to transmit a discovery transmission in accordance with the second type of discovery transmission, when the first UE device does not receive at least one discovery transmission via the separate discovery resource pool.

9. The first UE device of claim 8, wherein the first type of discovery transmission is an unsolicited discovery transmission.

10. The first UE device of claim 8, wherein the first type of discovery transmission is a solicited discovery transmission.

11. The first UE device of claim 10, wherein the transmitter is further configured to transmit a discovery response via a same discovery resource pool over which the solicited discovery transmission was transmitted.

12. The first UE device of claim 8, wherein the first UE device is out-of-coverage of the base station and the second UE device is in-coverage of the base station.

13. A method of discovery resource selection performed by a user equipment (UE) device, the method of discovery resource selection comprising:

receiving, from a base station, a System Information Block (SIB) message including resource pool configuration information indicating a separate discovery resource pool and a shared discovery resource pool, the separate discovery resource pool being dedicated for sidelink discovery transmission, the shared discovery resource pool being shared for both sidelink discovery transmission and sidelink communication transmission;

monitoring the separate discovery resource pool;

selecting the separate discovery resource pool for the sidelink discovery transmission when a result of monitoring the separate discovery resource pool is available; and selecting the shared discovery resource pool for the sidelink discovery transmission, when a result of monitoring the separate discovery resource pool is not available.

14. A non-transitory computer-readable recording medium having embodied thereon computer-readable instructions which, when executed by a processor, cause the processor to perform the method of claim 13.

15. An apparatus configured to cause a user equipment (UE) device to perform a method of discovery resource selection, the apparatus comprising:

a memory configured to store computer-readable instructions; and a processor configured to execute the computer-readable instructions, and when executing the computer-readable instructions, the processor is configured to cause the UE device to perform the method of sidelink resource selection, the method of discovery resource selection including:

receiving, from a base station, a System Information Block (SIB) message including resource pool configuration information indicating a separate discovery resource pool and a shared discovery resource pool, the separate discovery resource pool being dedicated for sidelink discovery transmission, the shared discovery resource pool being shared for both sidelink discovery transmission and sidelink communication transmission;

monitoring the separate discovery resource pool;

selecting the separate discovery resource pool for the sidelink discovery transmission when a result of monitoring the separate discovery resource pool is available; and selecting the shared discovery resource pool for the sidelink discovery transmission, when a result of monitoring the separate discovery resource pool is not available.

* * * * *